United States Patent [19]

Tsukada

[11] Patent Number: 4,846,673
[45] Date of Patent: Jul. 11, 1989

[54] PROCESS FOR PREPARING HEAT-RESISTANT COMPOSITE BODY

[75] Inventor: Kiyotaka Tsukada, Ogaki, Japan

[73] Assignee: Ibiden Co., Ltd., Ogaki, Japan

[21] Appl. No.: 223,274

[22] Filed: Jul. 22, 1988

[30] Foreign Application Priority Data

Dec. 25, 1987 [JP] Japan .................. 62-326698

[51] Int. Cl.$^4$ .............................................. F27D 5/00
[52] U.S. Cl. ............................................ 432/5; 432/6; 432/253
[58] Field of Search ............... 432/253, 258, 259, 261, 432/5, 6

[56] References Cited

U.S. PATENT DOCUMENTS

| | | | |
|---|---|---|---|
| 3,951,587 | 4/1976 | Alliegro et al. | 432/253 |
| 4,761,134 | 8/1988 | Foster | 432/253 |

FOREIGN PATENT DOCUMENTS

| | | |
|---|---|---|
| 53-142183 | 2/1978 | Japan . |
| 54-10825 | 5/1979 | Japan . |
| 61-214424 | 9/1986 | Japan . |

*Primary Examiner*—Henry C. Yuen
*Attorney, Agent, or Firm*—Frishauf, Holtz, Goodman & Woodward

[57] ABSTRACT

A process for preparing a heat-resistant composite body, comprising forming silicon carbide crystal powder into a molded product, sintering the molded product in a non-oxidizing atmosphere, and thereafter filling with metallic silicon the inside of permeable voids of said porous body obtained by sintering. Powder having an average particle diameter of 5 μm or less is used as said silicon carbide crystals to form it into secondary particles having an average particle diameter of from 40 to 150 μm and such a particle size distribution that 60% by weight or more of particles are included in ±20% of the average particle diameter. This is followed by pressure molding to form a molded product using a molding pressure such that said granular secondary particles collapse at their surface areas to mutually bond there and at the same time the insides thereof remain uncollapsed, and also the molded product may have a bulk specific density of from 1.1 to 2.0 g/cm$^3$. The molded product is heated to a temperature of from 1,400° to 2,100° C. to carry out sintering in a non-oxidizing atmosphere. Thereafter the inside of the resulting sintered body is filled with metallic silicon in an amount of from 45 to 140 parts by weight based on 100 parts by weight of the silicon carbide.

9 Claims, No Drawings

PROCESS FOR PREPARING HEAT-RESISTANT COMPOSITE BODY

BACKGROUND OF THE INVENTION

This invention relates to a heat-resistant composite body and a process for preparing it. More particularly, this invention is concerned with a composite body for use in heat-resistant jigs that can be suitably used in heat-resistant jigs for electronic industrial uses, for example, in diffusion and oxidation treatments of semiconductors, joining of diodes, glass sealing, and brazing of lead frames of packages.

Hitherto known as materials for heat-resistant jigs for electronic industrial uses are, for example, carbon/silicon carbide composite bodies comprising a silicon carbide film formed on the surface of a graphite substrate, quartz glasses, and composite bodies comprising a silicon carbide molded product filled with metallic silicon, which are used according to their respective purpose.

Incidentally, the above carbon/silicon carbide composite bodies comprising a silicon carbide film formed on the surface of a graphite substrate is required to be subjected to purification treatment by a method in which the graphite substrate is previously applied with a high temperature treatment in a halogen gas atmosphere, or the like method, thus economically disadvantageously costing a great deal. Also, the quartz glass is preferred from the viewpoint of purity, but has a somewhat low thermal resistance to easily cause deformation by softening.

As the composite bodies comprising a silicon carbide molded product filled with metallic silicon, Japanese Patent Publication No. 10825/1979 (U.S. Pat. No. 3,951,587) discloses an invention relating to "a semiconductor diffusion furnace comprising a process tube, a paddle having the dimension and shape with which it can be inserted to the tube, and at least one boat that can be supported by said paddle, wherein said process tube, paddle and boat are mainly composed of a matrix of sintered silicon carbide containing 5 to 30 % by weight of a high purity metallic silicon, and said metallic silicon imparts gas-impermeability to said process tube, paddle and boat. Japanese Unexamined Patent Publication No. 142183/1978 also discloses an invention relating to "a jig for a gas-impermeable silicon wafer, containing 35 to 70 % of silicon carbide and 65 to 30 % of metallic silicon in weight percent."

However, the sintered silicon carbide matrix described in the former Japanese Patent Publication No. 10825/1979 is a recrystallized silicon carbide, using as a starting material relatively so coarse silicon carbide particles as to have a large surface coarseness on its surface, so that not only it is difficult to prepare without applying any particular mechanical working a sintered body that is required to have especially high dimensional precision, but also it can be filled therein with the metallic silicon with an amount of relatively as small as from 5 to 30 % by weight.

On the other hand, the jig for a silicon wafer described in the latter Japanese Unexamined Patent Publication No. 142183/1978 contains metallic silicon in an amount of relatively as large as 30 to 65 % by weight, but Examples in its specification describe a process for preparing a jig obtained by impregnating with metallic silicon a special porous silicon carbide body comprising a molded product mainly comprised of carbon fiber and treated to be made into a silicon product, and a process for preparing a jig according to a reaction sintering method, obtained by heating a mixture comprising silicon carbide powder, metallic silicon powder, phenol resin, etc. The jigs obtained by these preparation processes are considered to be able to satisfy both the economical merits and strength with difficulty.

Incidentally, the heat-resistant jigs for use in electronic industries are mainly used in purpose to handle high purity products such as semiconductors. Accordingly, it is important for them to have a high purity and not to contaminate the products and also having superior wear resistance. Besides this, it is preferable for them to have superior thermal conductivity and thermal shock resistance as they are used in purpose in which heating and cooling are frequently repeated. However, it has been difficult to prepare a heat-resistant jig having such various superior properties.

Under such circumstances, the present inventors have ever developed a heat-resistant jig material that can particularly have superior thermal distribution and obtain uniform thermal distribution and quick heat response as compared with the above-mentioned conventionally known heat-resistant jig materials, and proposed in Japanese Unexamined Patent Publication No. 214424/1986 a heat-resistant jig and a process for preparing it.

However, since in the above invention a porous body obtained by sintering a molded product in which the respective particles of silicon carbide particles are present in a homogeneously dispersed state is impregnated with metallic silicon, there have had to be used silicon carbide powder having very uniform particle diameter in order to obtain a porous body having a markedly high permeable void volume.

SUMMARY OF THE INVENTION

Accordingly, in regard to the heat-resistant jig the present inventors have previously proposed, the present inventors further made studies to further increase the amount of impregnation with metallic silicon. As a result, they succeeded in obtaining a porous sintered silicon carbide having a markedly high permeable void volume and yet having a high strength, and impregnated this porous silicon carbide sintered body with metallic silicon, and thus finally reached a new finding of a silicon-carbide-based composite body having a very high thermal conductivity, uniform thermal distribution and quick thermal response. This invention has thus been accomplished.

This invention provides a heat-resistant composite body comprising a composite body of silicon carbide with metallic silicon, said metallic silicon existing in permeable voids in a porous silicon carbide sintered body, wherein;

silicon carbide crystals constituting said porous silicon carbide sintered body have an average particle diameter of 5 $\mu$m or less, and at least a part of said silicon carbide crystals is present in said sintered body in the state that it forms porous secondary particles secondarily gathered and bonded together, said permeable voids comprising (i) a group of fine voids having a void diameter of 3 $\mu$m or less, constituted of fine silicon carbide crystals having an average particle diameter of 5 $\mu$m or less and (ii) a group of relatively coarse voids having a void diameter of from 15 to 40 $\mu$m, constituted of porous secondary particles which are secondarily gathered and bonded to have an average particle diameter of from 40 μm to 150 μm and have such a particle size distribution that 60 % by weight or more of particles are included in ±20 % of the average particle diameter; and said metallic silicon exists in an amount of from 45 to 140 parts by weight based on 100 parts by weight of said silicon carbide;

and also provides a process for preparing it.

DESCRIPTION OF THE PREFERRED EMBODIMENTS

This invention will be described below in detail.

The composite body of this invention is required to use as a base material a porous silicon carbide sintered body (or a porous sintered silicon carbide) (hereinafter often referred to as merely "porous body") constituted of silicon carbide crystals having an average particle diameter of 5 μm or less, and at least a part of said silicon carbide crystals being present in the state that it forms porous secondary particles secondarily gathered and bonded together.

Constituting the porous body like this, the permeable voids in said porous body can be constituted of a group of fine voids formed by fine silicon carbide crystals and a group of relatively coarse voids formed by porous secondary particles which are secondarily gathered and bonded, thus achieving an intended high permeable void volume.

The composite body of this invention is mainly utilized as a heat-resistant jig material used in purpose in which a uniform thermal distribution and quick thermal response are required, and is a composite body to which high thermal conductivity and gas-impermeability have been imparted by impregnating the inside of permeable voids of the above porous body with metallic silicon having superior thermal conductivity.

The weight of the metallic silicon present in the composite body of this invention is required to be of from 45 to 140 parts by weight based on 100 parts by weight of the silicon carbide constituting the composite body. The presence of metallic silicon otherwise in the amount less than 45 parts by weight not only makes it difficult to obtain a composite body having a high thermal conductivity as aimed in this invention but also may result in difficulty in imparting the gas-impermeability. On the other hand, the upper limit of the amount of the metallic silicon present is a value depending on the upper limit of the permeable void volume of the porous body. The above metallic silicon may more suitably be present in an amount ranging from 55 to 140 parts by weight.

The porous body of this invention may preferably contain 30 % by weight or more of β-type silicon carbide. This is because it is important for the porous body to have a three-dimensional network structure in which crystals are mutually toughly bonded, and the content of 30 % by weight or more for the β-type crystal makes it able to obtain the porous body having the three-dimensional network structure in which crystals are mutually toughly bonded. This content may further preferably be 50 % by weight or more.

The porous body of this invention comprises a sintered body formed by sintering substantially without shrinkage, and the shrinkage factor accompanying the sintering may advantageously be 2 % or less. This is because a sintered silicon carbide formed by pressureless sintering accompanied with shrinkage at the time of sintering is preferable from the viewpoints of strength, wear resistance and so forth, but the shrinkage by sintering may result in decrease in the permeable void volume or may easily turn the voids into impermeable voids, thus not only making it difficult to fill them with the metallic silicon but also making it difficult to prepare the porous body having a high permeable void volume as aimed in this invention.

Also, it is advantageous for the porous body of this invention to have an average flexural strength of 5 kg/mm$^2$ or more. This is because the average flexural strength otherwise lower than 5 kg/mm$^2$ makes it easy for the porous body to break or crack when handled, making it difficult to utilize it as a heat-resistant jig.

The process for preparing the heat-resistant composite body of this invention will be described below.

According to this invention, the process comprises forming silicon carbide powder into a molded product, sintering the molded product in a non-oxidizing atmosphere, and thereafter filling with metallic silicon the inside of permeable voids of this porous body obtained by sintering, wherein a powder having an average particle diameter of 5 μm or less is used as said silicon carbide to form it into secondary particles having an average particle diameter of from 40 to 150 μm and such a particle size distribution that 60 % by weight or more of particles are present in +20 % of the average particle diameter, followed by pressure molding to form a molded product having a bulk specific density of from 1.1 to 2.0 g/cm$^3$, subsequently heating the molded product to a temperature of from 1,400° to 2,100° C. to carry out sintering, and thereafter filling the sintered body with metallic silicon in an amount of from 45 to 140 parts by weight based on 100 parts by weight of the silicon carbide, whereby a composite body of silicon carbide with metallic silicon can be prepared.

Usable as the method for making the silicon carbide powder into the secondary particles is the spray-dry particle-forming method widely known in the present technical field. More specifically, it is a method in which the silicon carbide powder is suspended in a medium such as water to make a slurry, and the resulting suspension is sprayed in a container maintained to a high-temperature state, followed by rapid drying to form the spray into the secondary particles.

There may also be used as a starting material a silicon carbide powder obtained by homogeneously dispersing the powder in a dispersion medium together with a deflocculant, followed by freeze-drying. Various ones can be used as the dispersion medium, but particularly advantageously usable are those having a melting point in the range of from −5° C. to 15° C., and particularly preferred is to use at least one selected from benzene and cyclohexane, or water.

Also, as a means for homogeneously dispersing the silicon carbide powder in the dispersion medium, it is advantageous to use a dispersing means such as a vibrating mill, an attritor, a ball mill, a colloid mill and a high speed mixer that are able to impart strong shear force.

Effective as the deflocculant further used when the silicon carbide powder is homogeneously dispersed in the dispersion medium are, in the case when the dispersion medium is organic one, cationic surface active agents as exemplified by aliphatic amine salts, aromatic amine salts, heterocyclic amine salts, polyalkylene polyamine derivatives, or nonionic surface active agents of ester types, ester ether types, ether types, nitrogen-containing types, or the like. In the case when the dispersion medium is water, effective are inorganic deflocculants as exemplified by ammonium oxalate and ammonia water, and organic deflocculants such as diethylamine, monoethylamine, pyridine, ethylamine, ammonium tetramethyl hydroxide, and monoethanolamine.

In carrying out such freeze-drying, the suspension may preferably be sprayed in an atmosphere maintained to a temperature lower than the melting point of the dispersion medium, followed immediately by freezing.

It is important in this invention to prepare a high-strength porous body having a high permeable void volume and excellently easy to handle as compared with conventionally known porous sintered silicon carbides, and, when the molded product is formed by pressure molding, it is important to carry out the molding with the molding pressure such that the granular secondary particles collapse at their surface areas to mutually bond there and at the same time the insides thereof remain uncollapsed. Making the molded product of this invention in this manner forms a double structural porous body having relatively coarse voids constituted by the granular secondary particles and fine voids constituted by silicon carbide particles inside the secondary particles, thus making it possible to enhance the permeable void volume, in other words, increase the amount for impregnation with the metallic silicon.

Incidentally, the crystal systems of the above silicon carbide include $\alpha$-types, $\beta$-types and amorphous types. Of these, $\beta$-type ones can be advantageously used because fine powder having an average particle diameter of 5 $\mu$m or less can be obtained with ease and yet a porous body having a relatively high strength can be readily prepared. Particularly preferred is to use a silicon carbide powder containing 50 % by weight or more of $\beta$-type silicon carbide. p In this invention, the above molded product must be made to have a bulk specific density of from 1.1 to 2.0 g/m$^3$. This is because the above bulk specific density otherwise smaller than 1.1 g/m$^3$ lessens the sites at which the silicon carbide particles mutually bond, resulting in a low strength of the resulting porous body to make poor the readiness to handle, and on the other hand the same otherwise larger than 2.0 g/m$^3$ makes it difficult to prepare the porous body having a high permeable void volume aimed in this invention and also may result in difficulty in preparing a heat-resistant composite body having high thermal conductivity.

In this invention, the above sintering temperature is required to be set to from 1,400° to 2,100° C. This is because the temperature otherwise lower than 1,400° C. makes it difficult to grow the necks at which the particles bond, resulting in obtaining no porous body having high strength, and on the other hand the temperature otherwise higher than 2,100° C. may bring the necks smaller than those having a given size among the necks once grown, to come to be in a constricted shape, or disappear in an extreme case, rather resulting in a lowering of strength.

In this invention, the above molded products is fired in a non-oxidizing atmosphere that may not bring about oxidation of the silicon carbide, for example, in a gaseous atmosphere comprising at least one selected from argon, helium, neon, nitrogen, hydrogen and carbon monoxide, or in vacuo.

In this invention, it is advantageous for the above molded product to be fired in the non-oxidizing atmosphere substantially without shrinkage. This is because the shrinkage in sintering is preferable from the viewpoints of improving the strength of the porous body, but the shrinkage by sintering may result in decrease in the permeable void volume or may easily turn the voids into impermeable voids. Accordingly, not only it becomes difficult to fill them with the metallic silicon, but also it is difficult to prepare a porous body with high dimensional precision while causing the shrinkage by sintering.

In this invention, the shrinkage factor may preferably be 2 % or less, particularly 1 % or less when the sintering is carried out substantially without shrinkage, in order to make it easy to fill the sintered body with the metallic silicon and obtain a porous body with high dimensional precision.

In this invention, in firing the above molded product, it is advantageous to suppress the volatilization of silicon carbide from the molded product. This is because the suppression of the volatilization of silicon carbide makes it possible to sufficiently grow the necks at which the particles of silicon carbide bond. Particularly when a porous body having high strength and excellently easy to handle, it is advantageous to control the rate of volatilization of silicon carbide to 5 % by weight or less.

Effective as the method for suppressing the above volatilization of silicon carbide is a method in which the molded product is set in a heat-resistant vessel that can intercept an invasion of open air, and it.is suitable to use as the above heat-resistant vessel a vessel with the quality of the material such as graphite or silicon carbide.

It is also preferable for the sintered body obtained in the above step to be impregnated with a carbonaceous material before being filled with the metallic silicon. Advantageously usable as this carbonaceous material are all sorts of organic materials as exemplified by furfural resins, phenol resins, lignin sulfonate, polyvinyl alcohol, corn starch, molasses, coal-tar pitch and alginic acid, or thermal decomposition carbons such as carbon black and acetylene black.

As methods for impregnation with these materials, the sintered body can be impregnated with these materials by conventional methods such as vacuum-impregnation or pressure-impregnation with a dispersion of these materials or an unpolymerized product of these materials.

Impregnating the above sintered body with the carbonaceous material as described above makes the carbonaceous material into carbon by the heat to be applied when it is filled with the metallic silicon described later, to produce a new silicon carbide film on the surface of voids of the above porous body, so that the bonding between the fused silicon and the porous body can be made tough and in addition the necks can be reinforced to increase the strength of the sintered body.

The carbon additionally contained in the porous body obtained in the above step may preferably be made present with a thickness of about from 0.1 to 1 $\mu$m on the surfaces of the inner walls of permeable voids.

This is because the above thickness otherwise smaller than 0.1 $\mu$m may result in so a thin film of silicon carbide formed on the surfaces of the voids in the porous body that there can be obtained not so great effect of strengthening the bond between the fused silicon and the porous body. On the other hand, the thickness otherwise larger than 1 $\mu$m may result in substantial increase in the proportion of the silicon carbide present in the composite body, thus making it difficult to obtain a composite body having a high metallic silicon content as aimed in this invention.

In the instance where this step for impregnation with carbonaceous materials is used, it is advantageous to fill the inside of the porous body with the metallic silicon, and thereafter the resulting product is maintained for 0.5 hour to 3 hours at temperatures of from 1,200° to 1,800° C.

In this invention, it is important for the above metallic silicon to be filled in an amount of from 45 to 140 parts by weight based on 100 parts by weight of the silicon carbide constituting the above porous body. The reason why the above metallic silicon is filled is not only that the metallic silicon has so a good affinity for silicon carbide that the strength can be improved by filling the inside of permeable voids of the porous body with the metallic silicon, but also that the metallic silicon has so a superior thermal conductivity that a heat-resistant composite body endowed with high thermal conductivity and gas-impermeability can be formed by filling the inside of permeable voids of the porous body with the metallic silicon.

Also, the above amount for filling the metallic silicon is limited to from 45 to 140 parts by weight for the reason that the amount for the above metallic silicon to be filled with otherwise less than 45 parts by weight makes it difficult to achieve the high thermal conductivity aimed in this invention, and on the other hand the upper limit for the filling amount depends on the permeable void volume of the porous body. The metallic silicon may more suitably be filled in an amount ranging from 55 to 140 parts by weight.

As methods for filling the inside of permeable voids of the porous body with the metallic silicon, there can be applied a method in which the metallic silicon is fused by heating followed by impregnation, or a method in which a finely powdered metallic silicon is dispersed in a dispersion medium and the porous body is impregnated with the resulting dispersion, followed by drying and thereafter heating to a temperature higher than the fusing temperature of the metallic silicon.

This invention will be described below by giving Examples and Comparative Examples.

EXAMPLE 1

Used as a starting material was silicon carbide powder having a $\beta$-type crystals content of 96 % by weight, containing 0.12 % by weight of free carbon, 0.37 % by weight of oxygen, $1.2 \times 10^{-4}$ % by weight of calcium, $8 \times 10^{-5}$ % by weight of sodium, $1 \times 10^{-5}$ % by weight of potassium and a trace amount of aluminum, and having an average particle diameter of 1.1 $\mu$m.

Based on 100 parts by weight of the above silicon carbide powder, 5 parts by weight of polyvinyl alcohol, 0.3 part by weight of monoethanolamine and 100 parts by weight of water were mixed, and the mixture was blended for 5 hours in a ball mill.

After blending, a suspension was discharged out of the ball mill, and sprayed in a container maintained at $-60°$ C. to obtain secondary particles freezed in the shape of granules. The secondary particles thus obtained had an average particle diameter of 0.11 mm and about 70 % by weight of the particles were included in $\pm 20$ % of the average particle diameter.

Next, the above secondary particles were put in a vessel maintained at 0.01 to 20 mmHg and $-5°$ to $-10°$ C., and freeze-drying was carried out to obtain a dried mixture.

The resulting dried mixture was collected in an appropriate amount and granulated, followed by pressing under a pressure of 800 kg/cm$^2$ using a hydrostatic pressing machine to form a molded product. The resulting molded product had a shape of a disc of 200 mm in diameter, 10 mm in thickness and 1.65 g/cm$^3$ (52 % by volume) in density.

The above molded product was put in a crucible made of graphite and sintered under 1 atmospheric pressure in an atmosphere mainly of argon gas, using a Tammann sintering furnace. The temperature was raised up to 2,000° C. at a rate of temperature rise of 2,000° C./hour, and maintained for 15 minutes at a maximum temperature of 2,000° C. During sintering, the CO gas partial pressure was controlled by appropriately adjusting the flow rate of argon gas so as to be 80 Pa or less in the region of from room temperature to 1,700° C. and to be in the range of from 300±50 Pa in the region higher than 1,700° C.

The sintered body obtained comprised a porous body having a density of 1.66 g/cm$^3$ and a permeable void volume of 49 % by volume, and had a content of $\beta$-type silicon carbide of 91 % by weight. The crystal structure thereof was observed by use of a scanning electron microscope to confirm that its permeable voids comprised a group of fine voids having a void diameter of about 1.6 $\mu$m, constituted of fine silicon carbide crystals having an average particle diameter of 3.9 $\mu$m and a group of relatively coarse voids having an average void diameter of about 20 $\mu$m, constituted of porous secondary particles comprising the above fine silicon carbide crystals which were gathered and bonded.

The linear shrinkage factor with respect to this sintered body was in the range of 0.3±0.1 % in any directions. This sintered body also had an average flexural strength as high as 13.5 kg/mm$^2$, and contained $3 \times 10^{-4}$ % by weight of aluminum, $6 \times 10^{-4}$ % by weight of iron and $4 \times 10^{-4}$ % by weight of nickel. Chromium, calcium and copper were all contained in trace amounts, and sodium and potassium, in an amount of less than $1 \times 10^{-4}$ % by weight each.

Subsequently, this sintered body was impregnated in vacuo with phenol resin (carbonization degree: 30 % by weight), followed by drying. Thereafter, the surface of the above porous body was coated with a slurry in which 100 parts by weight of metallic silicon having an average particle diameter of 20 $\mu$m and a purity of 99.9999 % by weight or more and 60 parts by weight of a 5 % by weight of acrylic ester/benzene solution were mixed to provide on the surface a coating of 380 g of metallic silicon. This porous body coated with the metallic silicon was heated at a temperature rise rate of 450° C./hour in an argon gas stream, and maintained for about 1 hour at a maximum temperature of 1,450° C. so that the metallic silicon coated on the surface of the above porous body may be brought to permeation into the inside of the porous body, thus obtaining a silicon carbide composite body.

The silicon carbide composite body thus obtained had a void volume of 1.7 % and had gas-impermeability, with the size made larger only by 0.03 % as compared to that prior to the filling with the metallic silicon, having an average flexural strength of as strong as 32.0 kg/mm$^2$, a thermal conductivity of as very good as 0.24 cal/cm.sec.°C., thus having been confirmed to be very superior as a heat-resistant jig material. Characteristics of the resulting porous body and silicon carbide composite body are shown in Table 1.

COMPARATIVE EXAMPLE 1

Using as a starting material a mixed powder obtained by mixing the silicon carbide powder used in Example 1 with a commercially available α-type silicon carbide (average particle diameter: 80 μm) in weight ratio of 3 : 7, a porous body was prepared in the same manner as in Example 1, followed by impregnation with metallic silicon to obtain a silicon carbide composite body.

The porous body had a density of 2.37 g/cm$^3$, a permeable void volume of 26 % by volume and an average flexural strength of relatively as low as 5.2 kg/mm$^2$. Also, the silicon carbide composite body obtained by being impregnated with metallic silicon had a void volume of 1.7 % and had gas-impermeability, but it had a metallic silicon content of 24 parts by weight based on 100 parts by weight of silicon carbide, and a thermal conductivity of 0.21 cal/cm.sec.°C.

EXAMPLE 2

Following the same procedures as in Example 1, mixed powders obtained by mixing in various mixing proportions the silicon carbide used in Example 1 with silicon carbide powder (average particle diameter: 1.2 μm) comprised of a commercially available α-type silicon carbide powder (average particle diameter: 2 μm) which was ground and further purified and subjected to particle size classification were used as starting materials to prepare porous bodies. Next, these porous bodies were impregnated with phenol resin (cabonization degree: 30 % by weight). Thereafter these porous bodies were set in a crucible made of graphite, and a bulk metallic silicon having a purity of 99.9999 % by weight or more was provided around the porous bodies, followed by heating at 1450° C. to prepare silicon carbide composite bodies having gas-impermeability.

Characteristics of the resulting porous bodies and silicon carbide composite bodies are shown in Table 1 together with those of Example 1.

As will be seen from Table 1, the porous bodies using the silicon carbide powder having a high mixing proportion for the β-type silicon carbide powder, i.e., the porous bodies using the silicon carbide powder in Example 1 as a starting material, had superior strength, considering the density.

EXAMPLE 3

Using secondary particles having an average particle diameter of 100 μm, prepared in the same manner as in Example 1 but by spray-drying the suspension mixed by the ball mill, a silicon carbide composite body was prepared. Characteristics of the resulting porous body and silicon carbide composite body are shown together in Table 1.

As described above, the heat-resistant composite body of this invention comprises a silicon carbide composite body having a skeletal structure of porous sintered silicon carbide, has superior wear resistance, and yet has superior thermal conductivity and thermal shock resistance, so that it can be advantageously applied as a heat-resistant jig material used in purpose in which heating and cooling are frequently repeated, thus being industrially very useful.

TABLE 1

| | Raw material powder β-type silicon carbide content (wt. %) | Molded product Bulk specific density (g/cm$^3$) | Porous body | | | | | | Composite body | | |
|---|---|---|---|---|---|---|---|---|---|---|---|
| | | | Density (g/cm$^3$) | Flexural strength (kg/mm$^2$) | Average particle diameter (μm) | β-type silicon carbide content (wt. %) | Average void diameter of a group of fine permeable voids (μm) | Average void diameter of a group of coarse permeable voids (μm) | Metallic silicon content (pbw) | Flexural strength (kg/mm$^2$) | Thermal conductivity (cal/cm · sec · °C.) |
| Example | 96 | 1.68 | 1.66 | 13.5 | 3.9 | 91 | 1.6 | 20 | 48 | 32.0 | 0.24 |
| Example 2-1 | 48 | 1.67 | 1.65 | 11.3 | 3.7 | 32 | 1.5 | 21 | 48 | 29.5 | 0.23 |
| Example 2-2 | 27 | 1.66 | 1.64 | 10.3 | 3.3 | 13 | 1.2 | 21 | 49 | 27.7 | 0.22 |
| Example 2-3 | 0 | 1.65 | 1.63 | 9.8 | 3.0 | 0 | 1.0 | 22 | 49 | 25.3 | 0.22 |
| Example 37 | 96 | 1.69 | 1.67 | 12.7 | 4.0 | 91 | 1.7 | 19 | 48 | 31.2 | 0.24 |

I claim:

1. An improved process for preparing a heat-resistant composite body, comprising forming silicon carbide crystalline powder into a molded product, sintering the molded product in a non-oxidizing atmosphere to form a permeable porous sintered body, and thereafter filling with metallic silicon the inside of the permeable voids of said porous sintered body, the improvement comprising:

forming silicon carbide crystalline powder having an average particle diameter of 5 μm or less into granular secondary particles having an average particle diameter of from 40 to 150 μm and a particle size distribution such that 60% by weight or more of the particles are included in ±20% of the average particle diameter;

pressure molding said granular secondary particles to form a molded product using a molding pressure such that said granular secondary particles collapse at their surface area to mutually bond to each other at said surface areas and at the same time the insides thereof remain uncollapsed, said molded product having a bulk specific density of from 1.1 to 2.0 g/cm$^3$;

heating said molded product to a temperature of from 1,400° to 2,100° C. in a non-oxidizing atmosphere to form a sintered body having permeable voids; and filling the permeable voids of said sintered body with metallic silicon in an amount of from 45 to 140 parts by weight based on 100 parts by weight of the silicon carbide.

2. The process as claimed in claim 1, wherein said sintered body having permeable voids is impregnated with a carbonaceous material prior to the filling the metallic silicon.

3. The process as claimed in claim 1, wherein said molded product is sintered in a gaseous atmosphere comprising at least one selected from argon, helium, neon, nitrogen, hydrogen and carbon monoxide, or in vacuo.

4. The process as claimed in claim 1, wherein said molded product is sintered while controlling the rate of volatilization of silicon carbide to 5 % by weight or less.

5. The process as claimed in claim 2, wherein said carbonaceous material is at least one selected from the group consisting of furfural resins, phenol resins, lignin sulfonate, polyvinyl alcohol, corn starch, molasses, coal-tar pitch, alginic acid, carbon black, and acetylene black.

6. The process as claimed in claim 2, wherein said sintered body is filled with the metallic silicon and thereafter the resulting filled sintered body is treated by heating for 0.5 hour to 3 hours at a temperature of from 1,200° to 1,800° C.

7. The process as claimed in claim 6, wherein said molded product is sintered while controlling the rate of volatilization of silicon carbide to 5% by weight or less; and 50% by weight or more of said crystalline carbide particles are $\beta$-type silicon carbide.

8. The process as claimed in claim 7, wherein said crystalline silicon carbide particles consist essentially of $\beta$-type silicon carbide.

9. The process as claimed in claim 1, wherein 50% or more of said crystalline carbide particles are $\beta$-type silicon carbide.

* * * * *